United States Patent [19]

Wilkins et al.

[11] 4,142,429
[45] Mar. 6, 1979

[54] INTERNAL TUBE CUTTER

[75] Inventors: Robert L. Wilkins, Greensburg; Donald E. Skoczylas, Monroeville, both of Pa.

[73] Assignee: Westinghouse Electric Corp., Pittsburgh, Pa.

[21] Appl. No.: 846,468

[22] Filed: Oct. 28, 1977

[51] Int. Cl.² .................. B23B 3/04; B23B 5/04; E21B 29/00
[52] U.S. Cl. ............................. 82/82; 82/4 C; 166/55.7
[58] Field of Search .............. 82/4 C, 1.2, 82; 166/55.7, 173, 176

[56] References Cited

U.S. PATENT DOCUMENTS

| 700,118 | 5/1902 | Hathorn | 82/82 |
|---|---|---|---|
| 2,494,193 | 1/1950 | Patrick, Jr. | 166/55.7 |
| 2,659,434 | 11/1953 | Osmun | 166/55.7 |
| 3,200,684 | 8/1965 | Read | 82/82 |

Primary Examiner—Harrison L. Hinson
Attorney, Agent, or Firm—L. A. DePaul; Z. L. Dermer

[57] ABSTRACT

An internal tube cutter for cutting the inside of tubes of a nuclear steam generator comprises an extendable cutter capable of being disposed within a tube of a steam generator along with a flexible transverse positioning mechanism disposed on the cutter for positioning the cutter within the tube. The cutter is attached to a drive mechanism that is capable of rotating the cutter when the cutter is in an extended position to thereby cut the inside of the tube. The cutter and flexible transverse positioning mechanism are capable of being inserted into and traversing through tubes whose inside diameter is severely reduced due to denting while being capable of being extended and severing the tube at a section of the tube having a normal diameter.

9 Claims, 8 Drawing Figures

INTERNAL TUBE CUTTER

BACKGROUND OF THE INVENTION

This invention relates to internal tube cutters and more particularly to internal tube cutters for internally cutting tubes of nuclear steam generators.

A typical nuclear steam generator comprises a vertically oriented shell, a plurality of U-shaped tubes disposed in the shell so as to form a tube bundle, a tube sheet for supporting the tubes at the ends opposite the U-like curvature, and a dividing plate that cooperates with the tube sheet forming a primary fluid inlet plenum at one end of the tube bundle and a primary fluid outlet plenum at the other end of the tube bundle. The primary fluid having been heated by circulation through the nuclear reactor core enters the steam generator through the primary fluid inlet plenum. From the primary fluid inlet plenum, the primary fluid flows upwardly through first openings in the U-tubes near the tube sheet which supports the tubes, through the U-tube curvature, downwardly through second openings in the U-tubes near the tube sheet, and into the primary fluid outlet plenum. At the same time, a secondary fluid, known as feedwater, is circulated around the U-tubes in heat transfer relationship therewith, thereby transferring heat from the primary fluid in the tubes to the secondary fluid surrounding the tubes causing a portion of the secondary fluid to be converted to steam. Since the primary fluid contains radio-active particles and is isolated from the secondary fluid by the U-tube walls and tube sheet, it is important that the U-tubes and tube sheet be maintained defect-free so that no breaks will occur in the U-tubes or in the welds between the U-tubes and the tube sheet, thus preventing contamination of the secondary fluid by the primary fluid.

Occasionally it is necessary to remove one or more of the heat transfer tubes from the tube bundle. In order to remove such a tube from the tube bundle it is first necessary to deactivate the steam generator and to cut the tube internally by entering the inlet plenum of the steam generator and extending a cutter into the tube. Once the cutter has been extended into the tube, the tube may be internally cut by the cutter and subsequently removed from the steam generator. However, some of the tubes chosen to be removed may be dented at intervals along the tube such that the cutter may not be able to traverse the tube. Therefore, it is desirable to have an internal tube cutter that is capable of being inserted into and traversing a constricted tube and yet capable of proper self-alignment within the tube such that the tube is properly cut.

SUMMARY OF THE INVENTION

An internal tube cutter capable of being inserted into a constricted heat transfer tube of a steam generator and capable of proper self-alignment therein comprises a frame having a locking mechanism attached thereto for engaging the tube sheet of a steam generator and an extendable cutter associated with the frame with a flexible transverse positioning mechanism disposed on the cutter for positioning the cutter within the tube while being able to negotiate the constricted portions of the tube. A drive mechanism mounted on the frame is capable of rotating the cutter when the cutter is in the extended position to thereby contact and cut the internal diameter of the tube.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

In a typical steam generator, a tube sheet supports a bundle of heat transfer tubes. Occasionally it is necessary to introduce a cutting mechanism into the tube to cut the tube so that the tube may be removed from the steam generator. The invention described herein provides an internal tube cutter that is capable of being introduced into a constricted tube of a steam generator for internally cutting the tube so that it may be removed from the steam generator.

Figure 1:
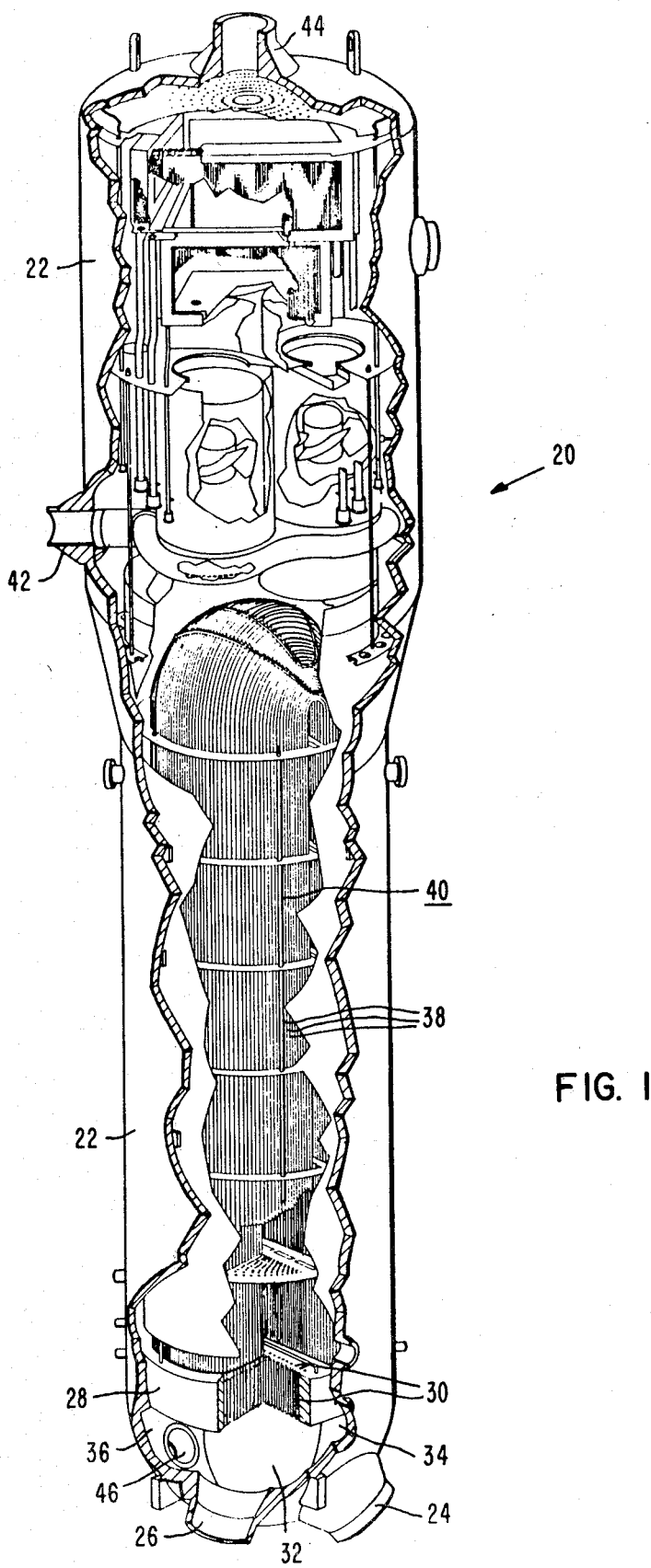
FIG. 1 is a partial cross-sectional view in elevation of a typical steam generator.

Referring to FIG. 1, a nuclear steam generator referred to generally as 20, comprises an outer shell 22 with a primary fluid inlet nozzle 24 and a primary fluid outlet nozzle 26 attached thereto near its lower end. A generally cylindrical tube sheet 28 having tube holes 30 therein is also attached to outer shell 22 near its lower end. A dividing plate 32 attached to both tube sheet 28 and outer shell 22 defines a primary fluid inlet plenum 34 and a primary fluid outlet plenum 36 in the lower end of the steam generator as is well understood in the art. Tubes 38 which are heat transfer tubes shaped with a U-like curvature are disposed within outer shell 22 and attached to tube sheet 28 by means of tube holes 30. Tubes 38 which may number about 7,000 form a tube bundle 40. In addition, a secondary fluid inlet nozzle 42 is disposed on outer shell 22 for providing a secondary fluid such as water while a steam outlet nozzle 44 is attached to the top of outer shell 22. In operation, primary fluid which may be water having been heated by circulation through the nuclear reactor core enters steam generator 20 through primary fluid inlet nozzle 24 and flows into primary fluid inlet plenum 34. From primary fluid inlet plenum 34 the primary fluid flows upwardly through the tubes 38 in tube sheet 28, up through the U-shaped curvature of tubes 38, down through tubes 38 and into primary fluid outlet plenum 36 where the primary fluid exits the steam generator through primary fluid outlet nozzle 26. While flowing through tubes 38, heat is transferred from the primary fluid to the secondary fluid which surrounds tubes 38 causing the secondary fluid to vaporize. The resulting steam then exits the steam generator through steam outlet nozzle 44. On occasion, it is necessary to remove a tube 38 from the steam generator 20 for inspection purposes. Therefore, manways 46 are provided in outer shell 22 to provide access to both primary fluid inlet plenum 34 and primary fluid outlet plenum 36 so that access may be had to the entire tube sheet 28. When it is necessary to internally cut and remove a tube 38 from the steam generator, working personnel enter manways 46 and attach an internal tube cutter (not shown) to the tube sheet so that the cutting process may be performed.

Figure 2:
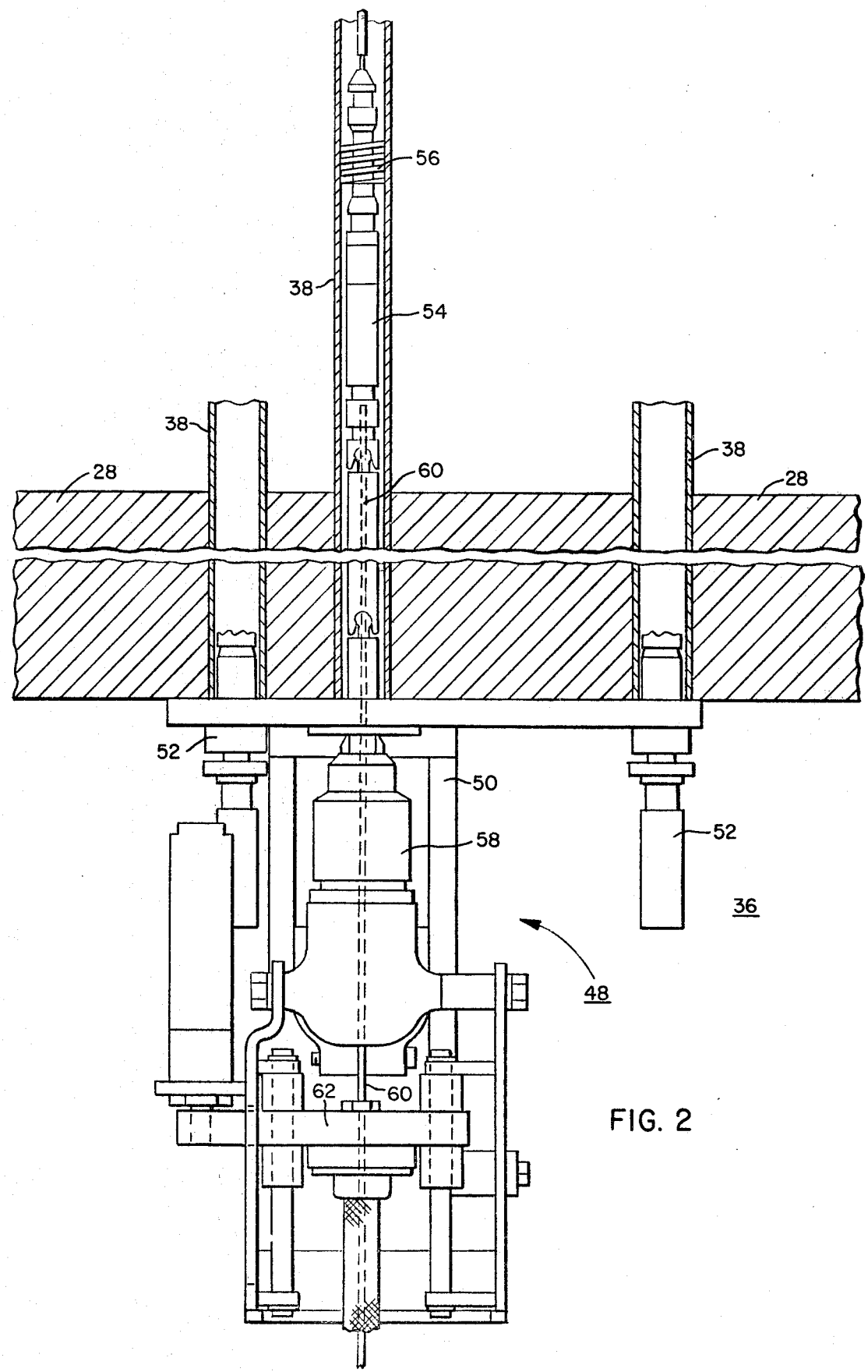
FIG. 2 is a partial cross-sectional view in elevation of the internal tube cutter attached to the tube sheet of a steam generator.
Figure 3:
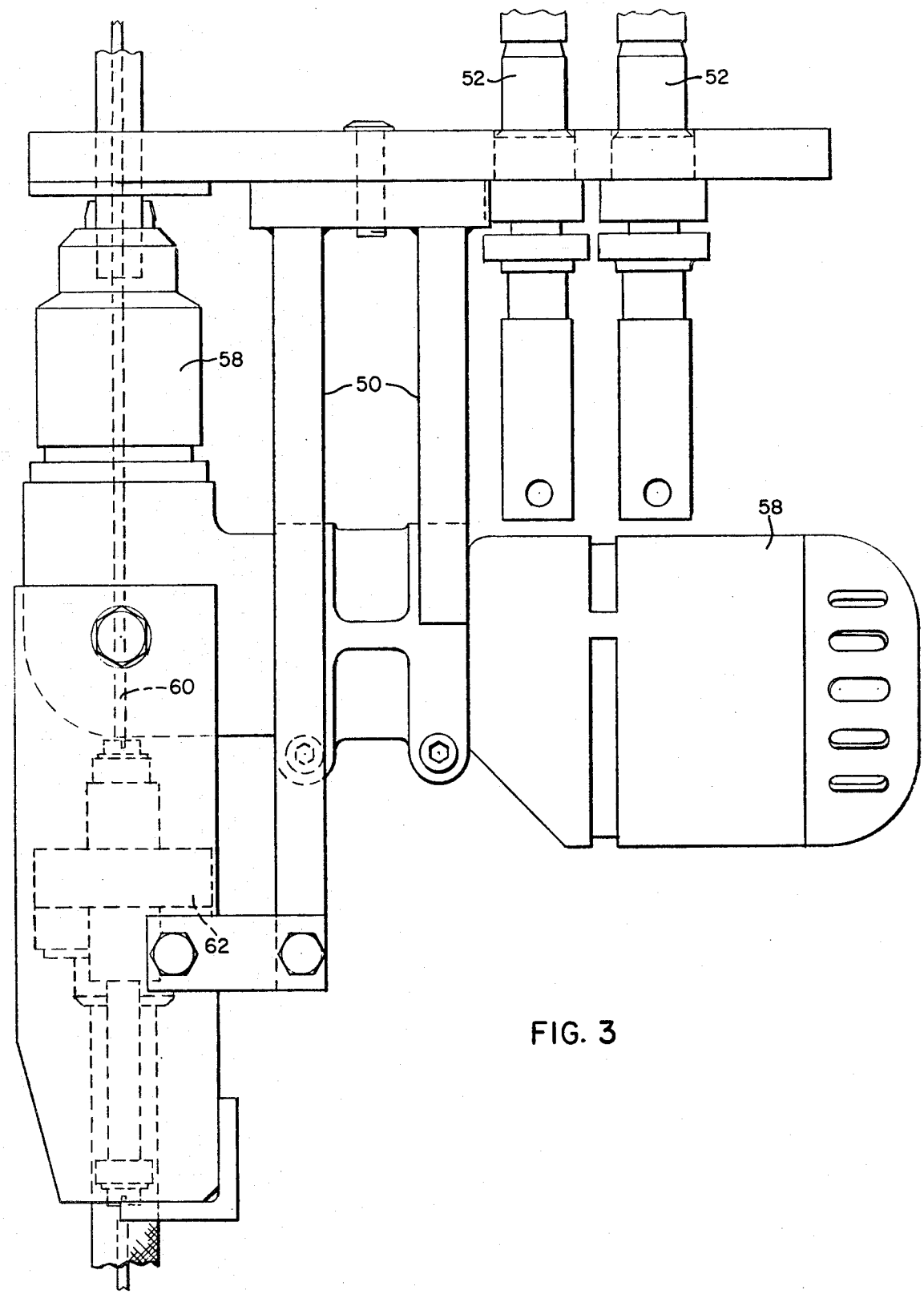
FIG. 3 is a side view of the tube cutter shown in FIG. 2.

Referring now to FIGS. 2 and 3, the internal tube cutter referred to generally as 48 comprises a frame 50 with locking mechanisms 52 attached thereto that are capable of being extended into the tubes 38 in the tube sheet 28. The locking mechanisms 52 may be camlocks chosen from those well known in the art. When activated, locking mechanisms 52 are capable of engaging the insides of tubes 38 thereby supporting frame 50 from tube sheet 28. An extendable cutter 54 is capable of being disposed within tube 38 and has a flexible transverse positioning mechanism 56 which may be a stainless steel wire brush attached thereto for positioning the cutter 54 within the tube 38. Flexible transverse positioning mechanism 56 is capable of negotiating the constricted portions of tube 38 while remaining centered within tube 38 at any given location. Flexible transverse positioning mechanism 56 provides the capability of allowing cutter 54 to be moved through any portion of tube 38 while maintaining the proper internal location of the cutter with respect to the tube 38. Cutter 54 is attached to a drive mechanism 58 which is mounted on frame 50. Drive mechanism 58 may be an electric motor with a right angle drive chosen from those well known in the art. Cutter 54 has a flexible elongated member 60 having one end attached thereto and having the other end extending through drive mechanism 58 and into contact with actuation mechanism 62.

Figure 4:
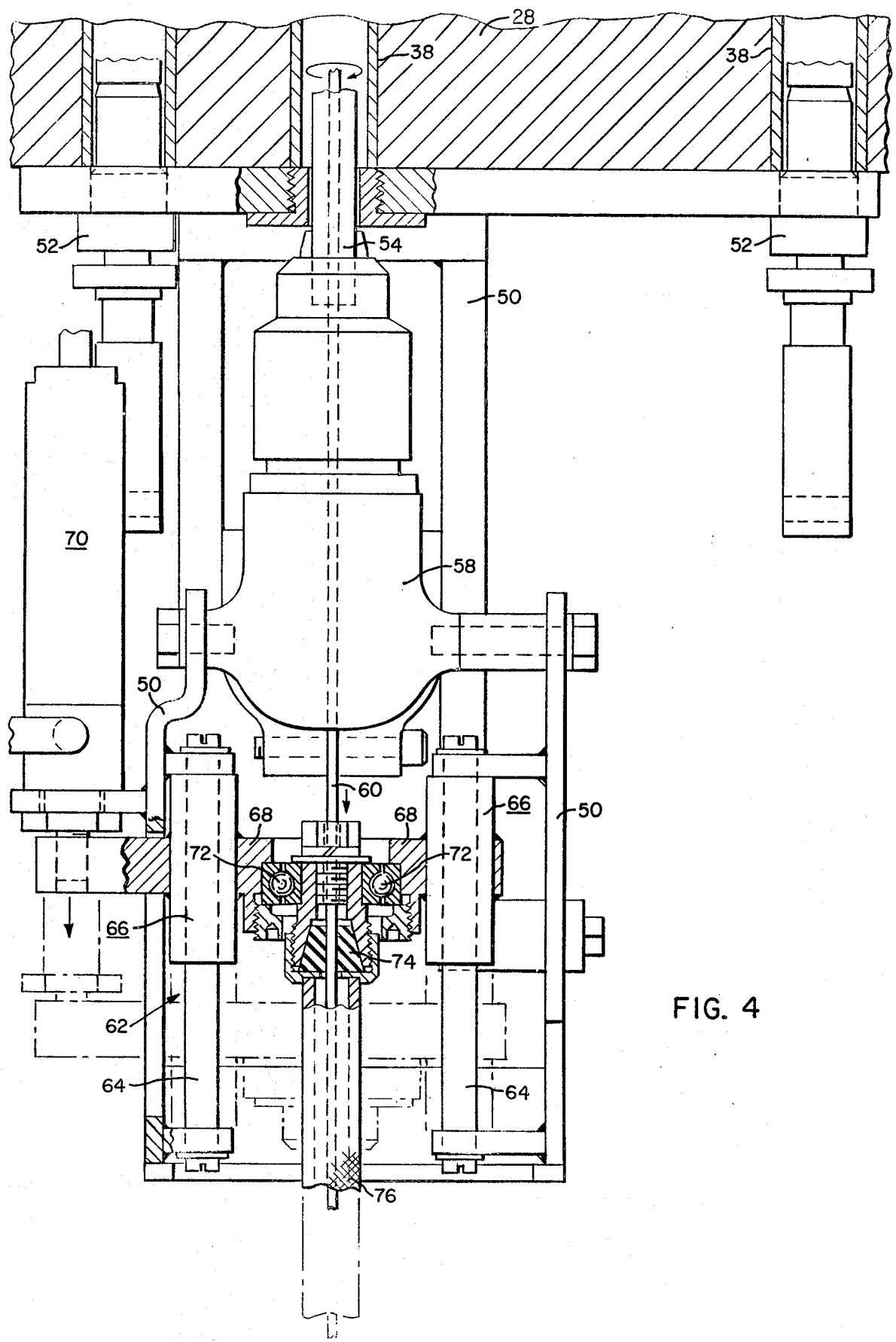
FIG. 4 is an enlarged partial cross-sectional view in elevation of the lower portion of the internal tube cutter.

Referring now to FIG. 4, actuation mechanism 62 comprises two vertical poles 64 attached to frame 50 with each pole having a slidable housing 66 disposed therearound that is capable of vertically sliding along poles 64. A mounting plate 68 is horizontally attached to both housings 66. A piston-cylinder arrangement 70 is mounted on frame 50 with the piston portion attached to mounting plate 68 such that when the piston is extended mounting plate 68 along with housing 66 are lowered along vertical poles 64. On the other hand, when the piston portion of piston cylinder arrangement 70 is withdrawn into the cylinder portion mounting plate 68 is moved upwardly towards tube sheet 28 and along vertical poles 64. Piston cylinder arrangement 70 may be an air operated piston cylinder arrangement chosen from those well known in the art. Actuation mechanism 62 further comprises bearings 72 chosen from those well known in the art and mounted on mounting plate 68. A collet mechanism 74 is internally mounted on bearings 72 such that collet mechanism 74 is capable of rotating about a vertical axis which may be defined by the flexible elongated member 60. Flexible elongated member 60 extends through drive mechanism 58 and extends through collet mechanism 74 such that collet mechanism 74 may be caused to tightly contact flexible elongated member 60 when handle 76 is manually rotated. In this manner flexible elongated member 60 may be firmly attached to actuation mechanism 62. When collet mechanism 74 is firmly contacting flexible elongated member 60, activation of piston-cylinder arrangement 70 can cause mounting plate 68 to be moved downwardly thus exerting a vertically downward force on flexible elongated member 60. This vertical downward force causes cutter 54 to be extended into contact with the inside of a tube 38. Since flexible elongated member 60 is attached to cutter 54 which is attached to drive mechanism 58, the rotation of drive mechanism 58 causes cutter 54 and flexible elongated member 60 to rotate about a vertical axis defined by tube 38. Of course, since both cutter 54 and flexible elongated member 60 are both flexible, the cutting process may also take place in a curved section of a tube 38. Bearings 72 allow flexible elongated member 60 and collet mechanism 74 to rotate with respect to mounting plate 68. Thus, actuation mechanism 62 is capable of contacting flexible elongated member 60 by means of collet mechanism 74 and exerting a vertically downward force on flexible elongated member 60 even when flexible elongated member 60 is being rotated by drive mechanism 58. Actuation mechanism 62 provides a means for engaging cutter 54 so that cutter 54 may be extended into contact with the inside of a tube 38 even when drive mechanism 58 is causing the rotation of cutter 54.

Figure 5:
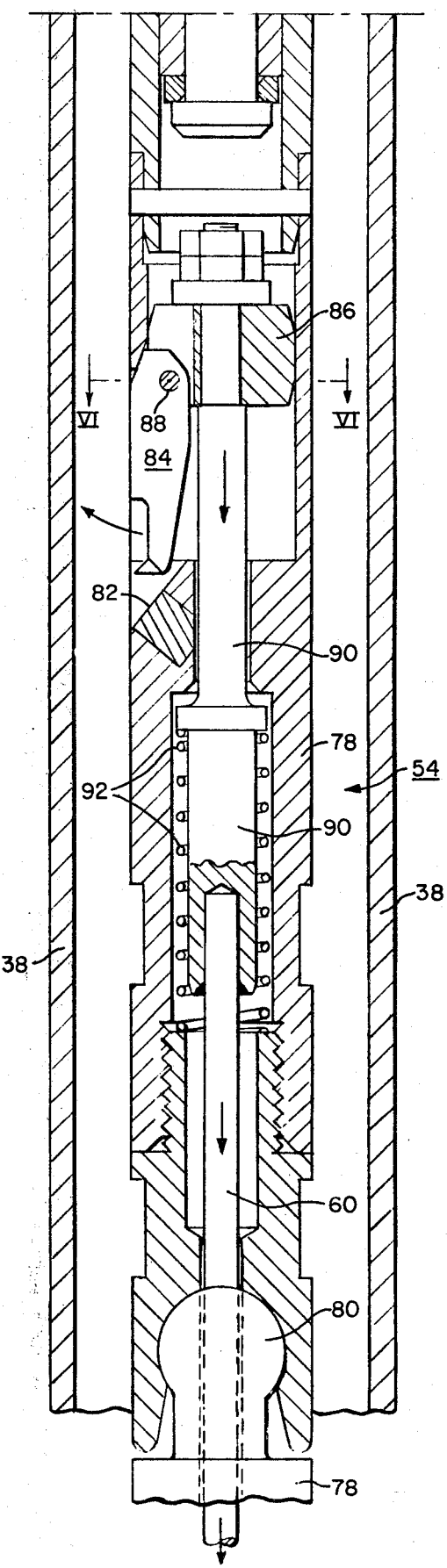
FIG. 5 is a cross-sectional view in elevation of the cutter in the retracted position within a tube.
Figure 6:
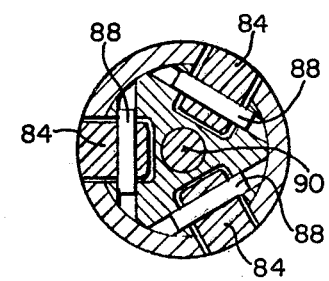
FIG. 6 is a view along line VI—VI of FIG. 5.
Figure 7:
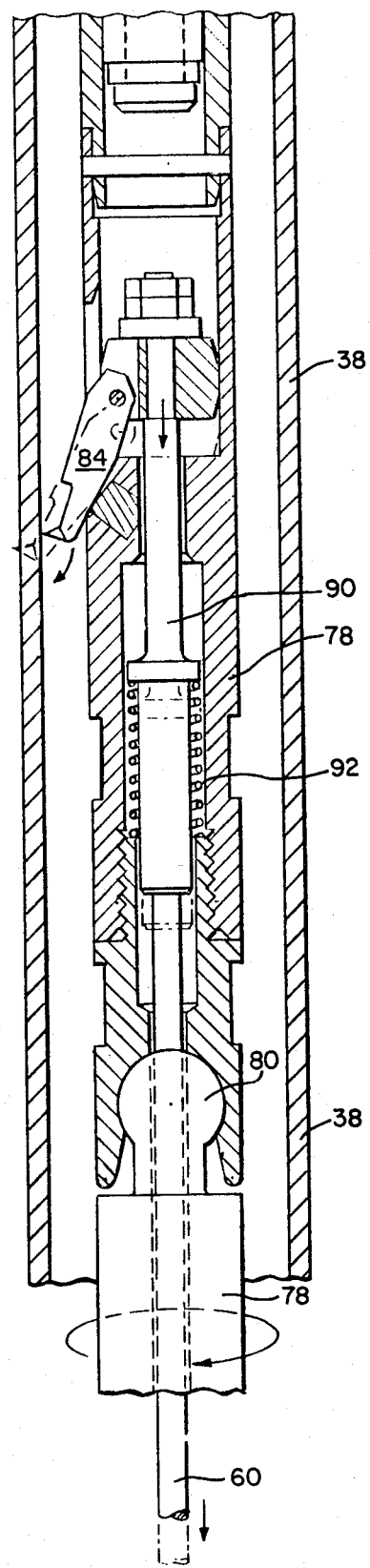
FIG. 7 is a partial cross-sectional view in elevation of the cutter in the extended position within a tube.

Referring now to FIG. 5, cutter 54 comprises a flexible shaft 78 attached to drive mechanism 58 which may be a series of metal members having rotatable ball and socket joints 80 and having a bore therein for the passage of flexible elongated member 60. Ball and socket joints 80 provide the capability of allowing flexible shaft 78 to adequately bend for insertion through manway 46 and to maneuver through curvatures in tube 38. Flexible shaft 78 has a camming surface 82 thereon which may be an inclined surface for directing cutting heads 84 into the direction of the inside of tube 38. Cutting heads 84 which may be tool steel blades are pivotally attached to bolt 86 by means of a pins 88. Bolt 86 may be a triangular shaped metal piece as shown in FIG. 6 and may be attached to metal column 90 which extends through flexible shaft 78 and is attached to flexible elongated member 60. A biasing mechanism 92 which may be a coil spring is also disposed within flexible shaft 78 and in contact with column 90 thereby exerting an upward force on column 90. When flexible elongated member 60 is drawn downwardly under the action of actuation mechanism 62, flexible elongated member 60 causes column 90 to also be drawn downwardly which being attached to bolt 86 causes cutting heads 84 to be drawn downwardly and into contact with camming surfaces 82. The contact of cutting heads 84 with camming surface 82 causes cutting heads 84 to be extended outwardly and into contact with the inside of tubes 38 as shown in FIG. 7. Energizing drive mechanism 58 causes flexible elongated member 60 to rotate about a vertical axis and causes cutting heads 84 to also rotate about a vertical axis and in contact with tube 38 thereby internally cutting tube 38. As tube 38 is cut, cutting heads 84 continue to be extended along the camming surface and further into the tube 38 thereby completely cutting the tube 38. When tube 38 has thus been severed, actuation mechanism 62 is released which allows flexible elongated member 60 to be driven upwardly by biasing mechanism 92 and then drive mechanism 58 is deenergized. Biasing mechanism 92 thus moves column 90 upwardly which causes cutting heads 84 to contact an upper portion of flexible shaft 78 and to pivot about pins 88 and back into flexible shaft 78 as shown in FIG. 5.

Figure 8:
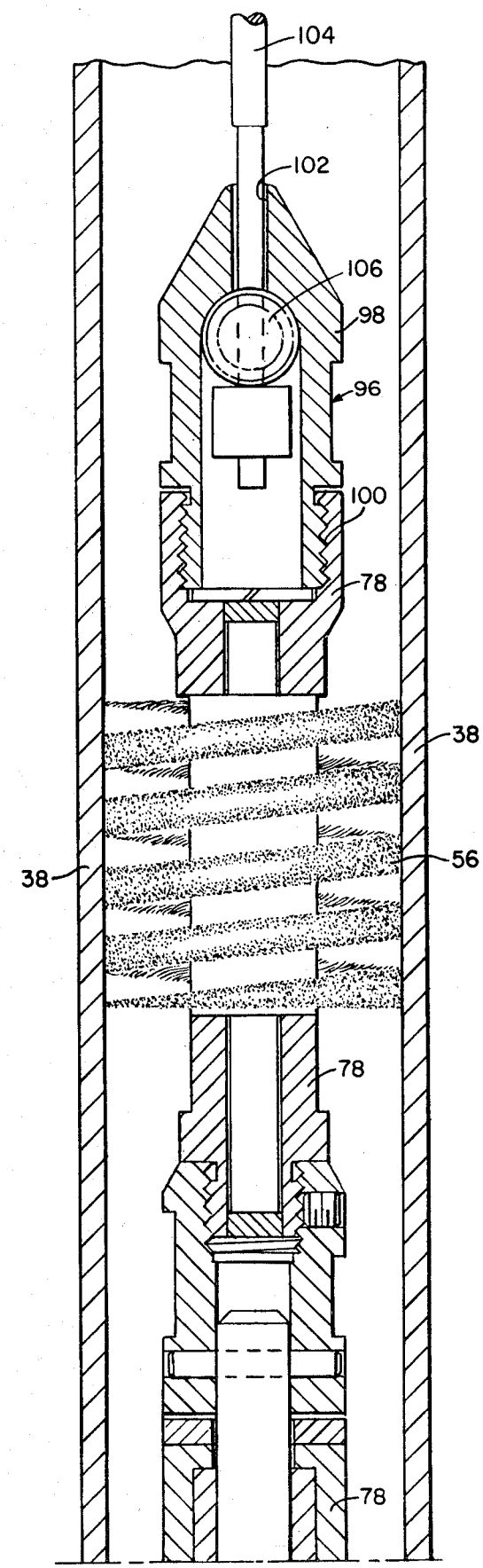
FIG. 8 is an enlarged partial cross-sectional view in elevation of the flexible transverse positioning mechanism.

Referring now to FIG. 8, a flexible transverse positioning mechanism 94 which may be a stainless steel wire spiral brush is mounted on flexible shaft 78 of cutter 54 and is capable of positioning cutter 54 within tube 38. Because flexible transverse positioning mechanism 94 is capable of being squeezed down as it passes through a constricted portion of tube 38 and regaining its original shape after passage through the constricted portion, flexible transverse positioning mechanism 94 is capable of aligning cutter 54 within tube 38 even in irregular shaped tubes 38. In cutting tubes 38 in an environment such as a nuclear steam generator wherein access is limited, it is important that the cutter such as cutter 54 be capable of positioning itself by means of a device such as flexible transverse positioning mechanism 94 such that the cutter is always properly positioned even though the exact transverse position of the cutter is not known to the operator. A longitudinal positioning mechanism 96 may be attached to the top of flexible shaft 78 above the location of flexible transverse positioning mechanism 94 for positioning cutter 54 along the length of tube 38 and for partially supporting the weight of internal tube cutter 48 during insertion. Longitudinal positioning mechanism 96 may comprise a lead head 98 which is removably attached to flexible shaft 78 by means of threads 100 and has an opening 102 in the top end thereof for accommodating the insertion of a flexible cable 104. The flexible cable 104 extends through opening 102 and into the interior of lead head 98. A rotatable ball 106 is bolted to the end of flexible cable 104 so that flexible cable 104 is rotatably attached to lead head 98. Since flexible cable 104 is of a much smaller diameter than cutter 54, flexible cable 104 may be threaded through the tube 38 and out the other end of tube 38 with flexible cable 104 being attached to lead head 98 such that flexible cable 104 may be pulled through tube 38 thus positioning cutter 54 within tube 38 or merely supporting the weight of internal tube cutter 48 during the insertion procedure.

OPERATION

When it is desired to remove a certain tube 38 from a steam generator, the steam generator is first deactivated so that working personnel may enter inlet plenum 34. Collect mechanism 74 is then tightened around flexible elongated member 60 so that cutting heads 84 are in their retracted position. At this point, flexible cable 104 is attached to ball 106 within lead head 98 and lead head 98 is threaded onto flexible shaft 78 along threads 100. Working personnel then extend flexible cable 104 through the chosen tube 38 until the flexible cable 104 exits tube 38 through outlet plenum 36 and position internal tube cutter 48 adjacent tube sheet 28 by inserting locking mechanisms 52 within tubes 38. When locking mechanisms 52 have thus been positioned within tubes 38, locking mechanisms 52 are activated which cause locking mechanisms 52 to engage the insides of tubes 38 and thus suspend frame 50 from tube sheet 28 as shown in FIG. 2. Working personnel may then pull flexible cable 104 through tube 38 until cutter 54 is located at the desired position along tube 38 while flexible transverse positioning mechanism 94 provides transverse positioning of cutter 54. Drive mechanism 58 is then activated which causes flexible elongated member 60 to be rotated and causes cutting heads 84 to be rotated. Piston-cylinder arrangement 70 is then activated which causes mounting plate 68 to be moved downwardly with respect to vertical poles 64 which cause a downward force to be exerted on flexible elongated member 60 which in turn causes column 90 to be moved downwardly. When column 90 is moved downwardly cutting heads 84 are also moved downwardly and into contact with camming surface 82 which causes cutting heads 84 to be moved outwardly and into contact with the inside of tubes 38. As cutting heads 84 cut tube 38, cutting heads 84 continue to be extended into tube 38, thereby completely cutting tube 38. When tube 38 has been entirely cut, actuation mechanism 62 is released which allows biasing mechanism 92 to cause column 90 to be moved upwardly which withdraws cutting heads 84 back into flexible shaft 78. When in this position internal tube cutter 48 may be removed from steam generator in a reverse manner in which it was placed therein. This procedure may then be performed on other tubes within the steam generator so that other tubes may thus be cut. Therefore, the invention provides an internal tube cutter which is capable of being placed within a tube having constrictions while the cutter is appropriately spaced within the tube for cutting the tube.

We claim as our invention:

1. An internal tube cutter comprising:
   a frame having locking mechanisms attached thereto for engaging a member and supporting said frame from said member;
   a flexible shaft associated with said frame and capable of being disposed within said tube;
   a plurality of cutting heads pivotally disposed within said flexible shaft for cutting said tube when extended and rotated;
   engagement means disposed within said flexible shaft for extending said cutting heads into contact with the inside of said tube and for rotating said cutting heads;
   a flexible transverse positioning mechanism mounted on said flexible shaft for positioning said cutting heads within said tube relative to the sides of said tube; and
   drive means mounted on said frame and attached to said cutting heads for rotating said cutting heads thereby causing said cutting heads to internally cut said tube.

2. The internal tube cutter according to claim 1 wherein said engagement means comprises:
   a camming surface defined on said flexible shaft near said cutting heads for extending said cutting heads into contact with said tube; and
   a flexible elongated member disposed within said flexible shaft with said cutting heads pivotally attached thereto and extending through said drive means for causing said cutting heads to contact said camming surface thereby extending said cutting heads into contact with the inside of said tube.

3. The internal tube cutter according to claim 2 wherein said engagement means further comprises:
   actuation means mounted on said frame and attached to said flexible elongated member for moving said flexible elongated member in a first direction thereby causing said cutting heads to contact said camming surface; and
   biasing means disposed within said flexible shaft and in contact with said flexible elongated member for moving said flexible elongated member in a direction opposite said first direction thereby moving said cutting heads away from said camming surface.

4. The internal tube cutter according to claim 3 wherein said actuation means comprises:
   collet means disposed around said flexible elongated member for firmly contacting said flexible elongated member;
   bearings contacting said collet means for allowing rotation of said collet means and said flexible elongated member with respect to said frame;
   a substantially horizontal mounting plate attached to said bearings and said frame for supporting said bearings and said collet means; and
   reciporcating means mounted on said frame and attached to said mounting plate for exerting force on said flexible elongated member thereby extending said cutting heads.

5. The internal tube cutter according to claim 4 wherein said internal tube cutter further comprises:
   a lead head having an opening therein mounted on said flexible shaft; and
   a flexible cable extending through said opening in said lead head and rotatably attached to a ball disposed therein for guiding said cutter through said tube.

6. The internal tube cutter according to claim 5 wherein said flexible transverse positioning mechanism comprises:
   flexible wires arranged spirally on said cutter and extending into contact with the inside of said tube for positioning said cutter therein.

7. The internal tube cutter according to claim 6 wherein said biasing means comprises a coil spring mounted on said flexible shaft and in contact with said flexible elongated member.

8. The internal tube cutter according to claim 7 wherein said reciprocating means comprises an air piston-cylinder arrangement mounted on said frame and attached to said mounting plate.

9. The internal tube cutter according to claim 8 wherein said locking mechanisms comprise camlocks mounted on said frame and capable of being inserted within a hole in said member for engaging said member thereby supporting said frame therefrom.

* * * * *